United States Patent
Mason et al.

(10) Patent No.: US 11,775,762 B1
(45) Date of Patent: Oct. 3, 2023

(54) DATA COMPARISION USING NATURAL LANGUAGE PROCESSING MODELS

(71) Applicant: States Title, LLC, San Francisco, CA (US)

(72) Inventors: Erica K. Mason, San Francisco, CA (US); Apoorv Sharma, San Francisco, CA (US); Andy Mahdavi, San Francisco, CA (US); Daniel Faddoul, San Francisco, CA (US)

(73) Assignee: States Title, LLC, San Francisco, CA (US)

( * ) Notice: Subject to any disclaimer, the term of this patent is extended or adjusted under 35 U.S.C. 154(b) by 259 days.

(21) Appl. No.: 17/127,708

(22) Filed: Dec. 18, 2020

(51) Int. Cl.
*G06F 40/295* (2020.01)
*G06F 16/33* (2019.01)
*G06F 40/30* (2020.01)
*G06F 40/284* (2020.01)

(52) U.S. Cl.
CPC ........ *G06F 40/295* (2020.01); *G06F 16/3347* (2019.01); *G06F 40/284* (2020.01); *G06F 40/30* (2020.01)

(58) Field of Classification Search
None
See application file for complete search history.

(56) References Cited

U.S. PATENT DOCUMENTS

| | | | |
|---|---|---|---|
| 10,984,231 B1* | 4/2021 | Vandivere | G06F 18/214 |
| 2008/0222028 A1* | 9/2008 | Santiago | G06Q 40/025 |
| | | | 705/38 |
| 2019/0370388 A1* | 12/2019 | Li | G06F 16/2365 |
| 2022/0179906 A1* | 6/2022 | Desai | G06N 3/08 |

OTHER PUBLICATIONS

Conway, Jennifer Jennifer Elizabeth. "Artificial intelligence and machine learning: current applications in real estate." PhD diss., Massachusetts Institute of Technology, 2018. (Year: 2018).*
U.S. Appl. No. 17/062,414, Sammons et al., filed Oct. 2, 2020.
Huynh, "Fuzzy Wuzzy: Find Similar Strings within one column in Python Token Sort Ratio vs. Token Set Ratio," May 20, 2020, retrieved Apr. 16, 2021 from URL <towardsdatascience.com/fuzzywuzzy-find-similar-strings-within-one-within-one-column-in-a-pandas-data-frame-99f6c2a0c212>, 14 pages.

* cited by examiner

*Primary Examiner* — Frank D Mills
(74) *Attorney, Agent, or Firm* — Fish & Richardson P.C.

(57) ABSTRACT

Methods, systems, and apparatus, including computer programs encoded on computer storage media, for natural language processing. One of the methods includes the steps of receiving a first set of labeled data from a first data source; receiving a text string from a second data source; performing natural language processing on the text string to extract particular text portions and generate a second set of labeled data; performing a comparison between the first set of labeled data and the second set of labeled data; and generating an output based on the comparison.

18 Claims, 4 Drawing Sheets

DATA COMPARISION USING NATURAL LANGUAGE PROCESSING MODELS

BACKGROUND

This specification relates to natural language processing. Natural language processing relates to using computers to process and analyze natural language data. Natural language processing systems can be used to perform a number of tasks on natural language content including text and speech. For example, conventional natural language processing systems can be used to perform character recognition (e.g., optical character recognition in an image), speech recognition, word segmentation, and semantic analysis of text.

SUMMARY

This specification describes techniques for comparing data from two or more different data sources. For example, a reconciliation analysis system can compare data from two data sources to determine whether the data are consistent. Based on the consistency evaluation, various actions can be taken with respect to the data.

One or more of the sources of data can include a string of textual data. Natural language processing techniques are used to process the text string. The processing can include extracting particular text portions and determining corresponding labels to associate with the extracted text portions. To perform the extraction and labeling, a natural language processing pipeline can perform tokenization, parts of speech tagging, name entity recognition, and domain phrase matching, each of which are described in greater detail below.

The subject matter described in this specification can be implemented in particular embodiments so as to realize one or more of the following advantages. A natural language processing model can allow for automatic extraction and labeling of data from one or more sources. The labeled and extracted text resulting from the natural language processing can be quickly compared with text data from one or more other sources. This allows for data reconciliation to be performed in an automated process and at a workflow stage that allows for early identification of discrepancies. This reduces overall workflow delays by addressing discrepancies earlier. The embodiments can provide consistency in how strings are interpreted and compared. Furthermore, the evaluation actions can vary according to different levels of strictness in application, e.g., based on different preferences of customers.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

This specification describes techniques for using natural language processing for use in data comparison. The natural language processing techniques are used to extract and label text strings. The results of the natural language processing techniques can be compared to data from one or more other sources. This comparison can be used to reconcile the data to ensure that the data matches. The reconciliation can include a number of comparison metrics to determine whether or not data matches. If the data do not match, the results of the comparison can be provided for further review.

In some implementations, the reconciliation is part of a workflow of a real estate transaction. For example, part of the workflow can include determining a vesting for the property. Vesting describes the name or names, a relationship status, and a type of holding for individuals taking title to a parcel of real property. The relationship status can be, for example, single, married, or separated. The type of holding can be, for example, joint possession, sole possession, etc. In some implementations, the real estate transaction is a refinance transaction. In a refinance transaction the owners of a parcel refinance the mortgage, typically by paying off an existing mortgage and taking a new mortgage out on the property.

As part of the transaction the parties provide vesting information, for example, in one or more forms related to the transaction. The current vesting associated with the parcel can also be determined, for example, from county records. If the purported vesting does not match the current vesting records, it can delay the overall real estate transaction. Identifying vesting mismatches early in the workflow can reduce these delays.

Reconciliation Analysis System

Figure 1:
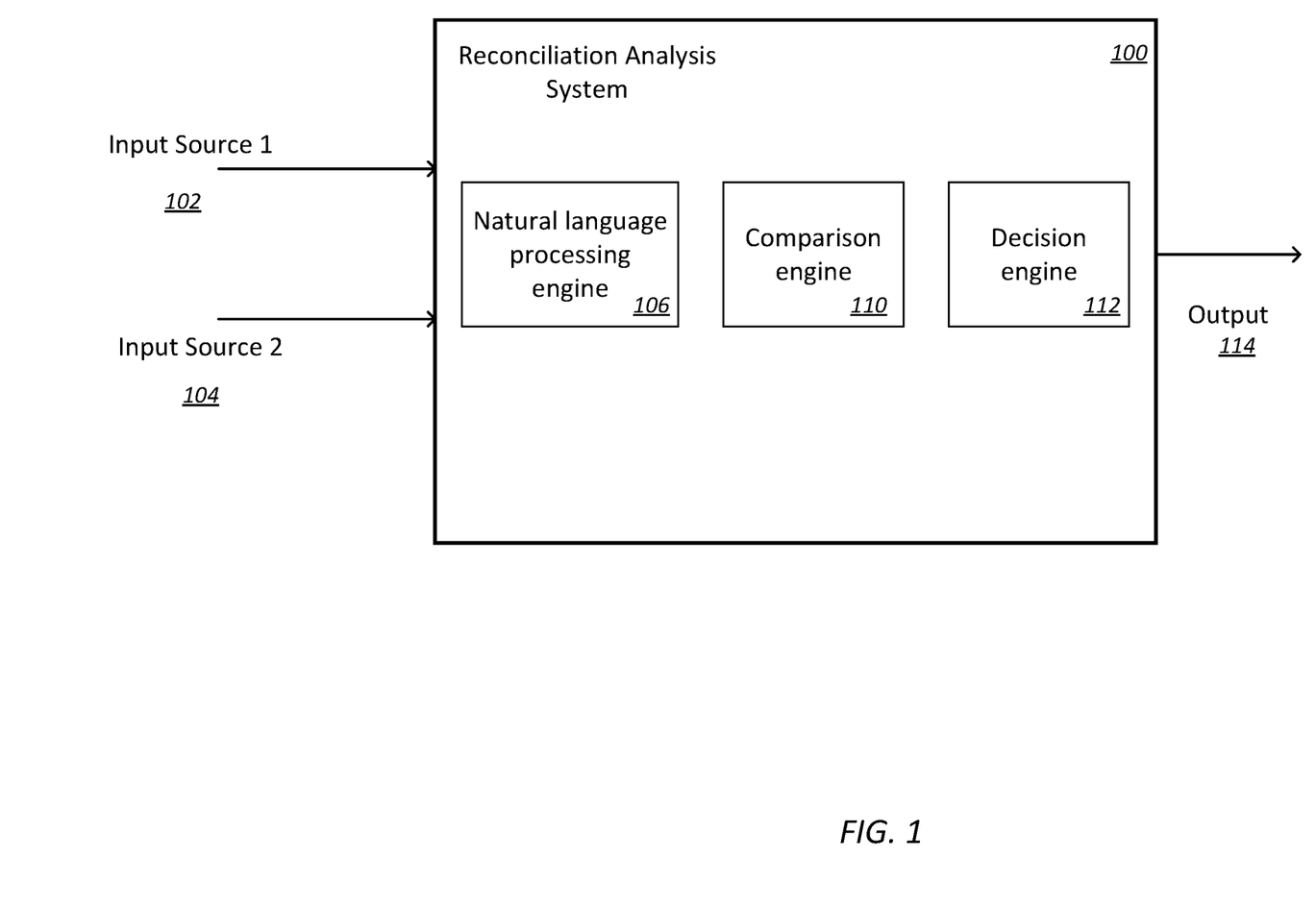
FIG. 1 is a block diagram of an example system for comparing data from two or more input sources.

FIG. 1 is a block diagram of an example system 100 for comparing data from two or more input data sources. In some implementations, the system 100 can be used to perform reconciliation on data from the input data sources to ensure that the data match.

The system 100 includes a natural language processing engine 106, a comparison engine 110, and a decision engine 112. The system 100 can receive as input data from multiple input data sources, in this example, input data source 1 102 and input data source 2 104.

The natural language processing engine 106 processes a text string received from one or more of the input data sources. The text string can be processed using one or more natural language processing models to extract particular text portions and to assign labels to the respective portions. The comparison engine 110 compares data received from the input data sources. The data from one or more of the sources may have been processed by the natural language processing engine 106 prior to being received by the comparison engine 110. The comparison engine 110 compares the data according to one or more comparison criteria that can include, for example, application of a number of different rules as well as fuzzy matching techniques. The decision engine 112 makes an overall decision based on the results of the comparison engine 110 and generates an output 114. For example, the decision engine can determine that the results indicate that the data from the different input sources match. The output 114 can confirm the match or that the data is consistent. In another example, the decision engine 112 can determine that the results indicate that further investigation is needed to determine whether the data match. In such a case, the output 114 can include a flag for manual review.

Natural Language Processing Engine

Figure 2:
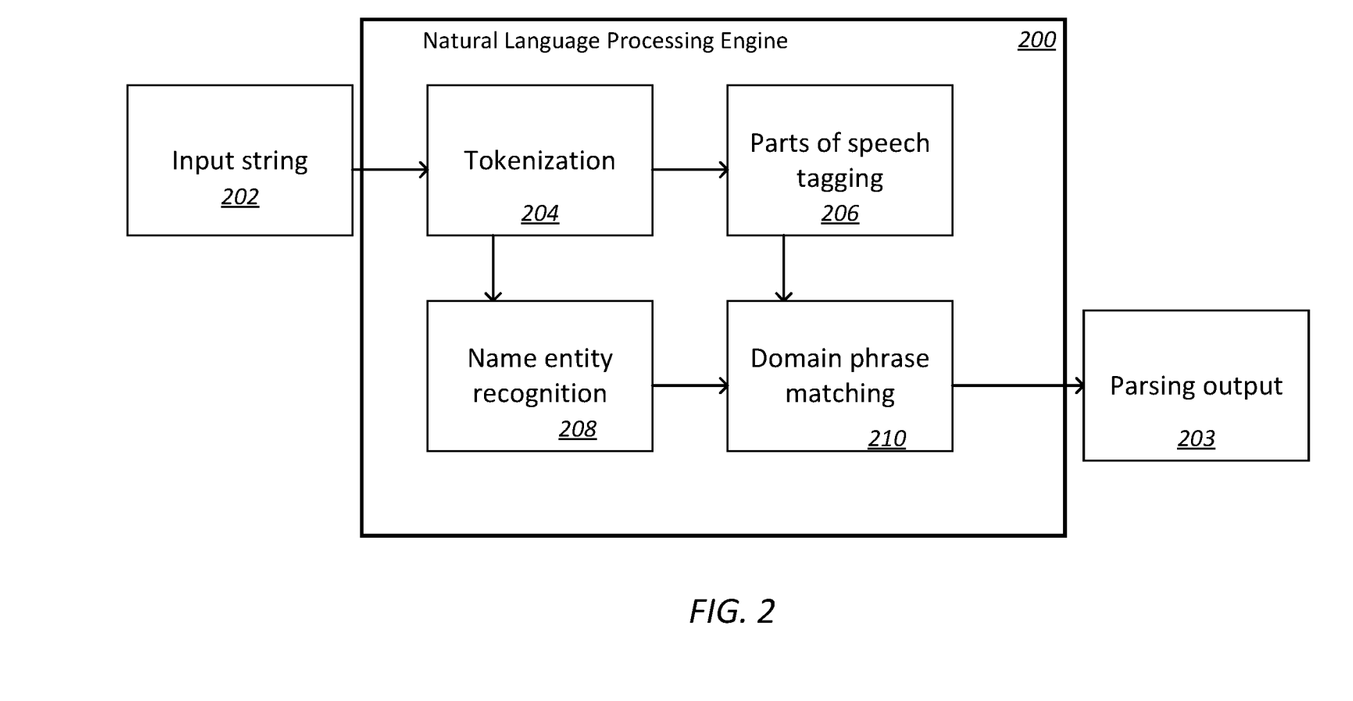
FIG. 2 is a block diagram of a natural language processing engine.

FIG. 2 is a block diagram of a natural language processing engine 200. The natural language processing engine 200 can be similar to the natural language processing engine 106 of the reconciliation analysis system 100 of FIG. 1.

The natural language processing engine 200 processes an input text string 202 to generate a labeled parsed output 203. To extract and label particular portions of the string, the string is processed according to a particular processing pipeline. The processing pipeline of the natural language processing engine 200 includes tokenization 204, parts of speech tagging 206, name entity recognition 208, and domain phrase matching 210.

The processing pipeline will be described with respect to an example input string related to the vesting of a parcel of real property. However, the natural language processing engine 200 can process other types of strings in a similar manner.

The input string 202 is first tokenized 204. Tokenization is the process of splitting the string into smaller units, which are called tokens. In this case the tokenization process splits each word and punctuation mark in the received text string into separate tokens.

For example, an input string related to vesting can be: "John Smith and Jane Smythe, a married couple, for their joint lives, remainder to the survivor of them".

The resulting tokenization output can be the following set of tokens: ["John", "Smith", "and", "Jane", "Smythe", ",", "a", "married", "couple", ",", "for", "their", "joint", "lives", "remainder", "to", "the", "survivor", "of", "them"]

Each of these tokens is then transformed into a vector representation of the word. This vector represents the meaning of each token/word where similar words have vectors that are close to each other. In some implementations, a word-to-vector technique is used that employs a neural network model to learn word associations from a collection of text. Once trained, the neural network model can generate a vector representation for each token as a string of numbers having a specified number of elements, e.g., 300 numbers. The values of the vectors are chosen by the neural network model based on the training, to indicate a semantic meaning of the token such that, for example, semantic similarity can be determined between vectors. The output set can be represented, for example, as the set of N vectors, represented, for example, as:

$$\{(x_{1,1} \ldots x_{1,300}) \ldots (x_{N,1} \ldots x_{N,300})\}$$

The set of word vectors can then be used for the parts of speech tagging 206. Parts of speech tagging is the process of feeding a list of word vectors into a neural network model that predicts which part of speech tag most likely applies to each token. The parts of speech tags include, for example, "NOUN" for noun, "ADJ" for adjective, "PROPN" for proper noun, "PRON" for pronoun, "PUNCT" for punctuation, "DET" for determiner, etc. The output for each token is a vector where each element corresponds to a likelihood, predicted by the neural network model, that the token belongs to a particular part of speech. From this, the tag corresponding to the element with the highest value is assigned to each token.

For example, the corresponding output to the set of N vectors from the example set of tokens can be: [PROPN, PROPN, CCONJ, PROPN, PROPN, PUNCT, DET, ADJ, NOUN, PUNCT, ADP, DET, ADJ, NOUN, PUNCT, NOUN, ADP, DET, NOUN, ADP, PRON].

Name entity recognition 208 is similar to the part of speech tagging process 206 in that the list of word vectors are again fed into a neural network model. However, in this case, instead of predicting the part of speech tag, the neural network model predicts whether the token is an "Entity" and if so, what type of entity it is. In some implementations, the following entity types can be predicted for a token: Person, Companies/Organization, Date, Geo Political Entity (City/Country/State), Cardinal numbers, Percentages. In addition, the neural network model can also predict the beginning and the end tokens for the entity as the entity can span across multiple tokens.

Here, for the same input set of word vectors generated above during tokenization, the output of the name entity recognition processing can be: [["John", "Smith"]: Person, ["Jane", "Smythe"]: Person].

Domain phrase matching 210 is performed on the outputs of the previous pipeline outputs, e.g., the parts of speech tagging, the name entity recognition, as well as the preprocessed words of the string. This process identifies phrases that are specific to a particular domain that the natural language processing engine is seeking to identify. A domain can be a particular, topic, profession, activity, etc. In some implementation, the domain involves phrases specific to real estate transactions generally or title vesting specifically.

In some implementations, the domain phrase matching 210 seeks to match word or word phrases based on a knowledge base of domain phrases. In the title vesting example, the knowledge base can contain common vesting relationship descriptions and tenancy descriptions. The knowledge base is essentially a list of common phrases that are searched for in the vesting string. If a matching work or phrase is identified, then the system can tag the span of tokens as e.g., a vesting relationship description or a vesting tenancy description, based on which list the match came from.

In some other implementations, instead of matching word for word from the knowledge base the domain phrase matching 210 matches patterns of a combination of the actual words and the tagged parts of speech to identify certain elements, in particular, trusts (as vesting can be held in a trust) and names with suffixes. An example pattern used to identify trusts is tokens corresponding to the following, in order:

Optional Determiner Part of Speech
One or more (in any combination) of Proper Nouns, Nouns, Conjunctions,
Numbers, Spaces, and Adjectives.
The actual word "Trust"
Examples that meet this pattern:
1) The Richardson Family Trust (Determiner, Proper Noun, Proper Noun, "Trust")
2) The cats and dogs 1995 Trust (Determiner, Noun, Conjunction, Noun, Number, "Trust")

Following the natural language processing operations, the natural language processing engine 200 generates a labeled parsed output 203 that contains the identified parsing including, for example, labeled vesting information such as the parties names, relationship, and vesting type. This information can be used to perform comparison operations as described with respect to FIG. 3.

Data Comparison

Figure 3:
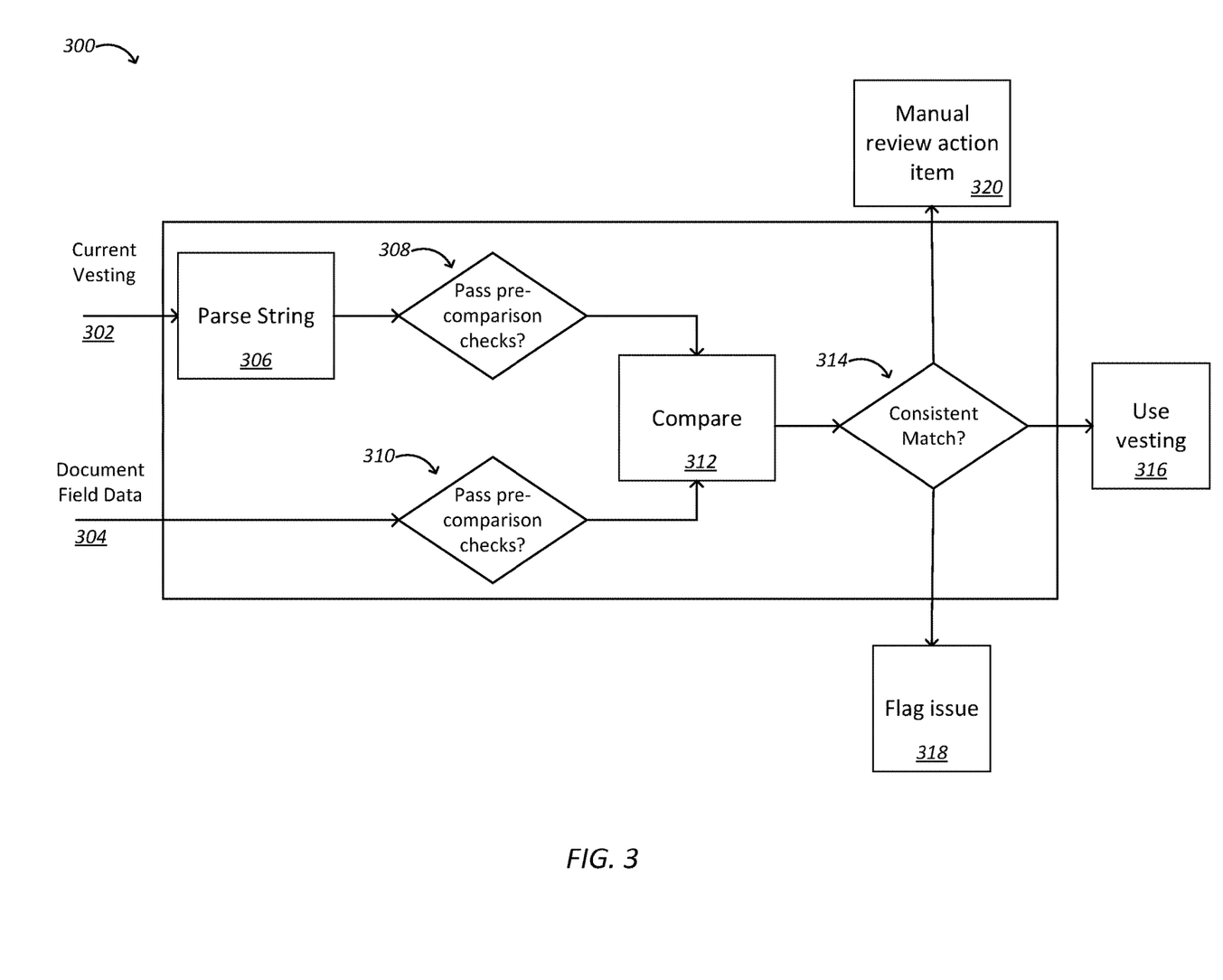
FIG. 3 is a diagram illustrating a data processing flow for comparing data from two sources.

FIG. 3 is a diagram illustrating a data processing flow 300 for comparing data from two data sources. FIG. 3 shows a comparison for two separate input data sources, one of which is parsed, e.g., by a natural language processing engine such as described with respect to FIG. 2. However, in other implementations, there may be more than two input data sources and more than one may be processed by natural language processing.

In FIG. 3, a first data source 302 and second data source 304 are shown. In the context of a vesting reconciliation system, the first data source 302 can be a text string e.g., a current vesting string while the second data source can be already labeled text, for example, corresponding to proposed vesting as extracted from one or more documents as part of a current transaction, for example, a refinance of a mortgage for a parcel of real property. In some implementations, the second data source 302 is parsed information obtained from a 1003 form, also known as a universal loan application form.

Figure 4:
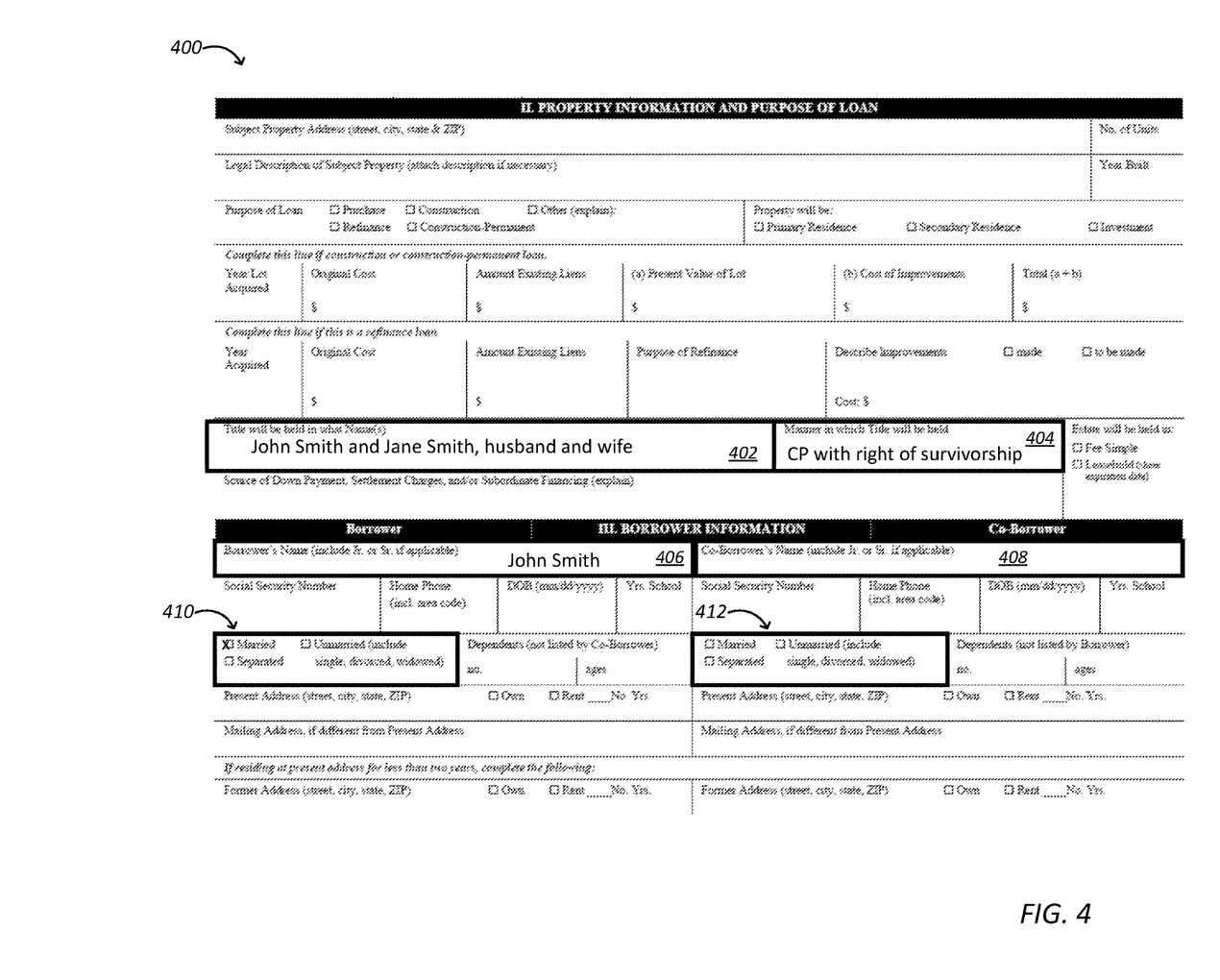
FIG. 4 is an example form illustrating text fields to be extracted and labeled.

An example of particular fields of the 1003 form from which information associated with vesting is extracted and labeled is shown in FIG. 4. FIG. 4 is an example form 400 having text fields to be extracted and labeled. In particular, FIG. 4 shows a portion of an example 1003 form. The form includes a number of different fields. However, only some of these fields are used for vesting. Other fields can be ignored by the processing. For example, the fields of particular interest can include the "title will be held in what Name(s)" field 402, "manner in which title will be held" field 404, borrowers name or names 406, 408, and relationship of the borrowers 410, 412.

Various techniques can be used to extract the relevant information from manual labeling to computer vision techniques, for example, as described in U.S. patent application Ser. No. 17/062,414 for "USING NEURAL NETWORK MODELS TO CLASSIFY IMAGE OBJECTS," filed on Oct. 2, 2020, which is incorporated here by reference.

The text string of the first data source is processed by a natural language processing engine as described with respect to FIG. 2. For example, the natural language processing engine parses (306) a text string representing the current vesting to generate a labeled parsed output.

For both the parsed output of the parsing step 306 and the already parsed input from the second data source 304, a pre-comparison check is performed for each set of parsed data 308 and 310. For either set of parsed data, checks can be performed prior to any comparisons between the two sets of parsed data. These checks, for example, can determine whether the parsed data from a given input source is internally consistent.

As an example, the vesting information obtained from the 1003 form can include both a name or names identifying who will hold the title as well as one or more names corresponding to borrower information. This information needs to satisfy one or more consistency rules. If the consistency check fails, then a flag can be generated and the comparison may not be performed. This flag can lead to manual evaluation of the information to try to resolve the discrepancies. In some implementations, the flag can be generated while still allowing the subsequent comparison to be performed, for example, based only on the title information of the 1003 form.

If the information is self-consistent, the pre-comparison check can pass and allow the system to move on to a comparison between the two labeled sets of parsed data 312.

A number of different types of checks can be performed on the 1003 form data as part of the pre-comparison checks 308.

In some implementations, the 1003 form was not validly parsed. In such a case a flag is generated that indicates that parsing could not be performed. For example, an error could have occurred in extracting the form information. This may be retried and, if successful, the process can resume.

In some implementations, the current vesting is of a type that must be manually evaluated at some stage. For example, the vesting identified from the 1003 form could be to a corporation e.g., as designated by an "LLC" designation for limited liability company. Again, this can result in a flag for follow up. The comparison with the current vesting can still be performed for consistency, but additional follow up will still be required because of the vesting type.

The 1003 form can include a "separated" checkbox under marital status. Separated parties often require particular workflow steps to be applied that may require manual review, which therefore causes a flag to be generated. For example, the flag can trigger a process for following up with the individuals involved to understand what their statuses actually are and how that affects the transaction. By identifying this issue earlier in the process, delays in completing the transaction can be reduced.

The 1003 form can include different borrower names in the borrower information section from the name or names listed in the "title will be held" section. For example, different borrower names from the title names, with no overlap, will generate a flag. However, if there are fewer named borrowers, but those named are listed in the title section, this will pass without a flag. This is because it is often the case that one party, e.g., one part of a married couple, is the only person named as a borrower even though both will be on the title.

In some implementations, a fuzzy matching process can be performed to determine whether there is truly a mismatch between sections of the 1003 form. For example, a name in the title may include a middle name, e.g., John Quinn Smith while the borrower is identified as John Q. Smith. Fuzzy matching can be used to determine whether to consider these to be matching names or different names. The fuzzy matching technique can generate a matching score and a match can be determined based on the score and a specified threshold value.

Similarly, a determination of whether the "manner in which title will be held" field has a valid entry. For example, only particular types of options may be allowed, such as, sole tenancy, joint tenancy, and tenancy in common. The system can compare the text corresponding to the "manner in which title will be held" field with a set of defined terms and phrases in a domain knowledge base to ensure that the entry is valid. In some implementations, variations are included in the domain knowledge base to expand the set of valid entries, e.g., an abbreviation "CPWROS" for "community property with right of survivorship." In other implementations, fuzzy matching techniques are employed to determine whether the text matches an entry in the domain knowledge base.

Similar pre-comparison checks 308 can be performed on the parsed data from the current vesting data.

If the labeled parsed data from both data sources passes the respective pre-comparison checks 308 and 310, the system compares 312 the labeled parsed data. A number of different comparison rules can also be applied when comparing the parsed data from the two data sources.

The system can compare the names identified in the vesting string parsed 306 from the first data source 302 with the names identified from the form data of the second data source 304, and in particular the names listed in the "title will be held in what names" field of the 1003 form. The objective of the comparison is to determine whether the two lists of names are similar enough to each other to be considered a match. For example, in a real estate transaction, determining that the names in the 1003 form match the current vesting may mean that a new vesting deed does not need to be issued for the parcel.

An example process for comparing the two lists of names is as follows:

Let, $L_1$ be the first list of names (or any strings) from the first data source and let $L_2$ be the second list of names from the second data source. The length, e.g., the number of text characters, of $L_1$ can be designated $|L_1|$, while the length of $L_2$ can be designated $|L_2|$.

A similarity function, $f_{similarity}$ ($S_1$, $S_2$) can be used to measure a similarity between the strings $S_1$ and $S_2$. In some implementations, the function is a token sort ratio which, for each string, tokenizes the string, cleans the string by removing capitalization and punctuation, and then sorts the tokens alphabetically. The function then measures a distance between the two sequences of tokens, e.g., a Levenshtein distance, and returns a similarity score. Additional details of the token sort ratio can be found at towardsdatascience.com/fuzzywuzzy-find-similar-strings-within-one-column-in-a-pandas-data-frame-99f6c2a0c212, which is incorporated by reference here in its entirety.

In particular, the determination of the similarity between the strings can include the following steps:

1. Pad the shorter list of $L_1$ and $L_2$ with empty strings such that the new lengths of $L_1$ and $L_2$ are equal to max($|L_1|$, $|L_2|$).
2. Instantiate an empty list for the potential matches P.
3. For each combination of strings $s_1$ and $s_2$, from the lists of strings, where $s_1$ is a string from $L_1$ and $s_2$ is a string from $L_2$:[e.g., $L_1$ can be a list of two names and $s_1$ can be a first name from the list $L_1$]
   a. score=$f_{similarity}$ ($s_1$, $s_2$)
   b. Append ($s_1$, $s_2$, score) to P
4. Sort values of P from the tuple with the largest score (highest similarity) to the tuple with the lowest score (lowest similarity).
5. Instantiate an empty list for the final matches M. For $s_1$, $s_2$, score in each tuple of P sorted:
   a. If neither $s_1$ nor $s_2$ are in any of the matches in M
   b. Add ($s_1$, $s_2$, score) to M
6. If any of the scores in M are lower than a specified threshold, then the indicator for whether the two lists are "similar enough" is set to False, else it is set to True.

The threshold is set in advance by comparing the scores to hand labeled outcomes and finding the threshold value that maximizes the number of correct indicators.

Other comparisons between the parsed data from each data source include a comparison of the number of borrower names in the 1003 as compared to the names in the current vesting can generate a flag. However, similar to the pre-checks described above, if there are two married people on the title and only one of the two people as borrowers in the 1003 form, and their marriage status is married, then no flag will be generated.

The system can compare marriage status in the 1003 form data with the current vesting. If there is a difference, a flag can be generated.

The system can compare for inconsistencies between marriage status and how title will be held, for example, the 1003 form can indicate a single individual in the "title will be held in what names" field while also indicating a married checkbox, while the current vesting does not indicate "sole and separate property." Without indication of vesting as sole and separate, the spouse of the individual would need to be added to the title, thus raising an issue that would need to be resolved.

Finally, the system can also generate a flag if for some reason a comparison cannot be made, for example, this can happen if we are not the system is not able to parse out the appropriate fields from the 1003 form e.g., because the OCR fails.

In addition to flags that require further analysis, there are other comparison results that may still be considered by the system as a pass. In some instances, whether or not a particular situation is allowed to pass may depend on a level of aggressiveness to which rules are applied. A more aggressive approach may allow more variations and inconsistencies to be considered a match while a more conservative approach may flag more inconsistencies for further review. The level of aggressiveness may be numerically defined and adjustable.

The system can determine, based on the comparison, that there are variations in middle name completeness between the two data sources, for example one with middle name and one without or full middle name vs. middle initial. The system can assume that when a borrower completes the 1003 form, for example, that they do not know the form of the current vesting and there is generally not a need to get a new vesting deed based on this inconsistency.

The system can identify some variations when comparing the type of vesting. For example, the 1003 form can indicate "JTWROS" (joint tenants with right of survivorship) while the current vesting indicates "community property" or other variation on "joint tenants" such as "for their joint lives". The system can first determine that the difference is not just a variation on the same vesting, e.g., a different wording meaning the same thing or an abbreviation. A domain knowledge base can aid the system in this determination. For example, whether these two vesting texts mean legally the same can depend on the State. The domain knowledge base can be used to define jurisdictional based rules for evaluating such variations in the type of vesting.

If they are not the same vesting, the system can assume that the borrower doesn't know the difference between the different vesting forms as long as a form of joint tenancy is in both. By contrast, a joint tenancy on one vs. a sole tenancy on the other can raise a flag that needs to be resolved.

The system can determine that the vesting and the marital status is consistent but not an exact match. For example, the vesting can be "sole" on the 1003 form while the current vesting just indicates that the person is single or unmarried. Since this is consistent with a sole vesting no flag is raised as long as the 1003 form does not indicate that the person is married. In another example, the 1003 form can include a sole vesting and a married checkbox while the current vesting is "married person with sole and separate property," which is also consistent.

In some other instances, the vesting may appear inconsistent but be allowed to pass. For example, the 1003 may specify one person while indicating a joint tenancy or community property. If there is also one person on the current vesting, the error may be ignored in some cases depending on how aggressively the rule is applied. In another example, two married people may be identified as holding title in the current vesting while the 1003 vesting only lists one person to hold the title, while still reflecting a married status.

The system can determine that no tenancy is specified in one of the data sources, which may be allowed to pass in some instances. For example, if the current vesting lists two or more people on the title but no tenancy, this can pass if the relationship is consistent between the data sources, for example, married in both cases.

In some instances, the system can allow the comparison to pass when there is missing information from the current vesting. For example, the current vesting may only include a single name without relationship status or tenancy. This may be allowed to pass, for example, if the 1003 form information is still a single name and identifies a tenancy.

In some implementations, the system identifies extra verbiage in one of the data sources that does not change the vesting to be compared. For example, the current vesting can identify "NOT AS JOINT TENANTS BUT AS TENANTS IN COMMON" where the "NOT AS . . . " portion doesn't change that the vesting is tenants in common. If the 1003 form is consistent with the tenants in common then the vesting can be considered to match.

In some implementations, the system determines spelling differences in the names between the data sources. This may be ignored and allowed to pass depending, for example, on the degree of difference in the spelling. For example, if only one change is needed to make the names match, e.g., add one character, delete one character, or change one character, referred to as an edit distance of 1, then the names can be considered matching. In particular, the matching can be determined based on the strong similarity determination described above.

The system can determine, based on the comparison, that the current vesting includes information not found on the 1003 form, for example, because there is no field in the form for the information. For example, it is possible for different ownership percentages between names in the current vesting (e.g., 70% to one party and 30% to another party). However, since the 1003 form doesn't have a place to specify ownership percentages, the system can assume that this discrepancy is still correct.

In some scenarios, the comparison may indicate a pass, but may still include a note for review. For example, if the vesting specifies a trust, this can require additional evaluation and processing steps and therefore while not inconsistent it still requires follow-up.

Based on the results of the comparisons, the system determines an output 314 based on whether the comparison identifies a consistent match or not. If the system determines that there is consistency or non-flagged inconsistencies as described above, the vesting can pass 316. This output may mean, for example, that no new vesting deed is required for a refinance real estate transaction, which may then proceed to a next step in a workflow for the transaction.

If the system determines that there is a flagged issue 318, the output identifies the flag or flags raised in the comparison. This can include flagged issues identified in the earlier pre-comparison check, but that allowed comparison to proceed. In response to the flagged output, manual intervention may be required to resolve the issues which may be document errors or issues that require contacting the parties or their representatives for clarification.

The system may also identify results for manual review 320. This can occur, for example, when a flag is not raised but further review is needed. An example of this is when the vesting includes a trust or a company as a vesting party.

This specification has described techniques for evaluating and comparing data from multiple sources in order to perform reconciliation of the data. In the context of a real estate transaction, the reconciliation can be performed on vesting information between a currently recorded vesting and a proposed vesting, for example, as part of application documents for a real estate transaction such as a refinance. Conventional techniques require manual review and comparison of documents to compare the vesting information. This can lead to a number of quality control errors that cause delays in the transaction. By using the natural language processing and data comparison techniques described in this specification, vesting reconciliation can be automated with a reduced error rate and earlier identification of potential problems.

In this specification, the term "database" will be used broadly to refer to any collection of data: the data does not need to be structured in any particular way, or structured at all, and it can be stored on storage devices in one or more locations.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or electronic system that may include one or more processing devices and memory to store executable instructions to perform the operations described in this specification.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

In addition to the embodiments of the attached claims and the embodiments described above, the following embodiments are also innovative:

Embodiment 1 is a method comprising: receiving a first set of labeled data from a first data source; receiving a text string from a second data source; performing natural language processing on the text string to extract particular text portions and generate a second set of labeled data; performing a comparison between the first set of labeled data and the second set of labeled data; and generating an output based on the comparison.

Embodiment 2 is the method of embodiment 1, wherein performing natural language processing comprises: tokenizing the text string into individual words and punctuation marks; and transforming each token into a word vector representation of the word comprising a string of numbers that represent the semantic meaning of the token.

Embodiment 3 is the method of any one of embodiments 1 through 2, further comprising: performing parts of speech tagging using the word vectors to label each token with a particular part of speech; performing name entity recognition using the word vectors to label tokes as corresponding to particular entities; and using the outputs of the parts of speech tagging and name entity recognition to perform domain phrase matching.

Embodiment 4 is the method of any one of embodiments 1 through 3, wherein prior to performing the comparison, performing one or more pre-comparison checks for internal consistency in one or more of the respective first and second sets of labeled data.

Embodiment 5 is the method of any one of embodiments 1 through 4, wherein the comparison is performed in response to a determination that the data is consistent.

Embodiment 6 is the method of any one of embodiments 1 through 5, wherein performing the comparison between the first set of labeled data and the second set of labeled data comprises applying a similarity function to content from the first data source and the second data source to calculate a similarity score and comparing the similarity score to a specified threshold.

Embodiment 7 is a system comprising: one or more computers and one or more storage devices storing instructions that are operable, when executed by the one or more computers, to cause the one or more computers to perform the method of any one of embodiments 1 to 6.

Embodiment 8 is a computer storage medium encoded with a computer program, the program comprising instructions that are operable, when executed by data processing apparatus, to cause the data processing apparatus to perform the method of any one of embodiments 1 to 6.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving a first set of labeled data from a first data source;
   receiving a text string from a second data source corresponding to one or more particular fields of a document;
   performing natural language processing on the text string to extract particular text portions and generate a second set of labeled data;
   determining, from the second set of labeled data, first text portions associated with vesting information, wherein determining the first text portions associated with the vesting information comprises comparing the particular text portions with entries in a domain knowledge base corresponding to particular vesting types;
   evaluating the second set of labeled data for consistency with a vesting type corresponding to the first text portions;
   in response to determining consistency, performing a comparison between the first set of labeled data and the second set of labeled data; and
   generating an output based on the comparison.

2. The method of claim 1, wherein performing natural language processing comprises:
   tokenizing the text string into individual words and punctuation marks; and
   transforming each token into a word vector representation of the word comprising a string of numbers that represent the semantic meaning of the token.

3. The method of claim 2, further comprising:
   performing parts of speech tagging using the word vectors to label each token with a particular part of speech;
   performing name entity recognition using the word vectors to label tokes as corresponding to particular entities; and
   using the outputs of the parts of speech tagging and name entity recognition to perform domain phrase matching.

4. The method of claim 1, wherein prior to performing the comparison, performing one or more pre-comparison checks for internal consistency in one or more of the respective first and second sets of labeled data.

5. The method of claim 4, wherein the comparison is performed in response to a determination that the data is consistent.

6. The method of claim 1, wherein performing the comparison between the first set of labeled data and the second set of labeled data comprises applying a similarity function to content from the first data source and the second data source to calculate a similarity score and comparing the similarity score to a specified threshold.

7. A system comprising:
   one or more computers and one or more storage devices storing instructions that are operable, when executed by the one or more computers, to cause the one or more computers to perform operations comprising:
   receiving a first set of labeled data from a first data source;
   receiving a text string from a second data source corresponding to one or more particular fields of a document;
   performing natural language processing on the text string to extract particular text portions and generate a second set of labeled data;
   determining, from the second set of labeled data, first text portions associated with vesting information, wherein determining the first text portions associated with the vesting information comprises comparing the particular text portions with entries in a domain knowledge base corresponding to particular vesting types;
   evaluating the second set of labeled data for consistency with a vesting type corresponding to the first text portions;
   in response to determining consistency, performing a comparison between the first set of labeled data and the second set of labeled data; and
   generating an output based on the comparison.

8. The system of claim 7, wherein performing natural language processing comprises:
   tokenizing the text string into individual words and punctuation marks; and transforming each token into a word vector representation of the word comprising a string of numbers that represent the semantic meaning of the token.

9. The system of claim 8, the operations further comprising:
   performing parts of speech tagging using the word vectors to label each token with a particular part of speech;
   performing name entity recognition using the word vectors to label tokes as corresponding to particular entities; and
   using the outputs of the parts of speech tagging and name entity recognition to perform domain phrase matching.

10. The system of claim 7, wherein prior to performing the comparison, performing one or more pre-comparison checks for internal consistency in one or more of the respective first and second sets of labeled data.

11. The system of claim 10, wherein the comparison is performed in response to a determination that the data is consistent.

12. The system of claim 7, wherein performing the comparison between the first set of labeled data and the second set of labeled data comprises applying a similarity function to content from the first data source and the second data source to calculate a similarity score and comparing the similarity score to a specified threshold.

13. One or more non-transitory computer storage media encoded with computer program instructions that when executed by one or more computers cause the one or more computers to perform operations comprising:
   receiving a first set of labeled data from a first data source;
   receiving a text string from a second data source corresponding to one or more particular fields of a document;
   performing natural language processing on the text string to extract particular text portions and generate a second set of labeled data;
   determining, from the second set of labeled data, first text portions associated with vesting information, wherein determining the first text portions associated with the vesting information comprises comparing the particular text portions with entries in a domain knowledge base corresponding to particular vesting types;
   evaluating the second set of labeled data for consistency with a vesting type corresponding to the first text portions;
   in response to determining consistency, performing a comparison between the first set of labeled data and the second set of labeled data; and
   generating an output based on the comparison.

14. The computer storage media of claim 13, wherein performing natural language processing comprises:
   tokenizing the text string into individual words and punctuation marks; and
   transforming each token into a word vector representation of the word comprising a string of numbers that represent the semantic meaning of the token.

15. The computer storage media of claim 14, further comprising:
   performing parts of speech tagging using the word vectors to label each token with a particular part of speech;
   performing name entity recognition using the word vectors to label tokes as corresponding to particular entities; and
   using the outputs of the parts of speech tagging and name entity recognition to perform domain phrase matching.

16. The computer storage media of claim 13, wherein prior to performing the comparison, performing one or more pre-comparison checks for internal consistency in one or more of the respective first and second sets of labeled data.

17. The computer storage media of claim 16, wherein the comparison is performed in response to a determination that the data is consistent.

18. The computer storage media of claim 13, wherein performing the comparison between the first set of labeled data and the second set of labeled data comprises applying a similarity function to content from the first data source and the second data source to calculate a similarity score and comparing the similarity score to a specified threshold.

* * * * *

UNITED STATES PATENT AND TRADEMARK OFFICE
CERTIFICATE OF CORRECTION

PATENT NO.        : 11,775,762 B1
APPLICATION NO.   : 17/127708
DATED             : October 3, 2023
INVENTOR(S)       : Erica K. Mason et al.

Page 1 of 1

It is certified that error appears in the above-identified patent and that said Letters Patent is hereby corrected as shown below:

On the Title Page

Column 1, Lines 1-2, item (54) and in the Specification Column 1, Lines 1-2: please delete "DATA COMPARISION USING NATURAL LANGUAGE PROCESSING MODELS" and replace with --DATA COMPARISON USING NATURAL LANGUAGE PROCESSING MODELS--.

Signed and Sealed this
Twenty-first Day of November, 2023

Katherine Kelly Vidal
*Director of the United States Patent and Trademark Office*